(No Model.)

E. H. TAYLOR.
COUPLING.

No. 454,922.   Patented June 30, 1891.

Witnesses
Geo. W. Breed
Edward Thorpe

Inventor
Edward H. Taylor
By his Attorney
Jacob Felbel

THE NORRIS PETERS CO., PHOTO-LITHO., WASHINGTON, D. C.

UNITED STATES PATENT OFFICE.

EDWARD H. TAYLOR, OF TRENTON, NEW JERSEY.

COUPLING.

SPECIFICATION forming part of Letters Patent No. 454,922, dated June 30, 1891.

Application filed March 16, 1891. Serial No. 385,162. (No model.)

*To all whom it may concern:*

Be it known that I, EDWARD H. TAYLOR, a citizen of the United States, and a resident of Trenton, in the county of Mercer and State of New Jersey, have invented certain new and useful Improvements in Couplings, of which the following is a specification.

My invention relates generally to a means for securely coupling or connecting together two parts or devices, but more especially to a means for connecting a metal pipe-section or coupling to an earthenware or like structure—as, for instance, the supply-pipe or coupling to the horn or inlet-nozzle of an earthenware basin or water-closet bowl—and has for its main objects to provide a secure, durable, and water-tight joint or connection.

My invention consists in the features of construction and combinations of devices hereinafter more fully described, and particularly pointed out in the appended claims.

Figure 1:
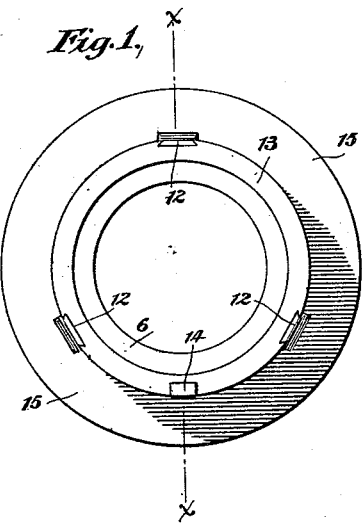
Figure 2:
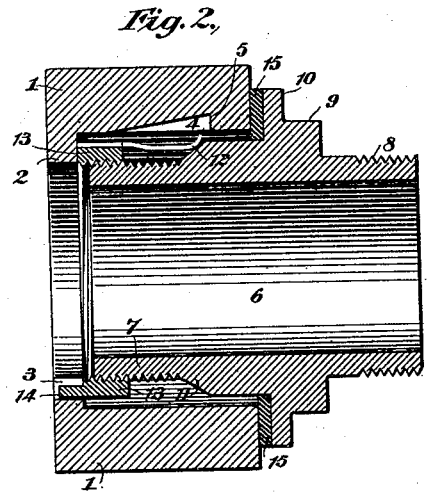
Figure 3:
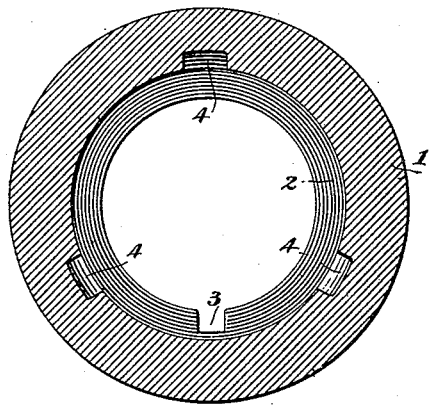
Figure 4:
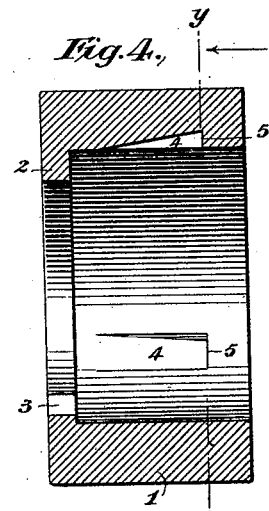
Figure 5:
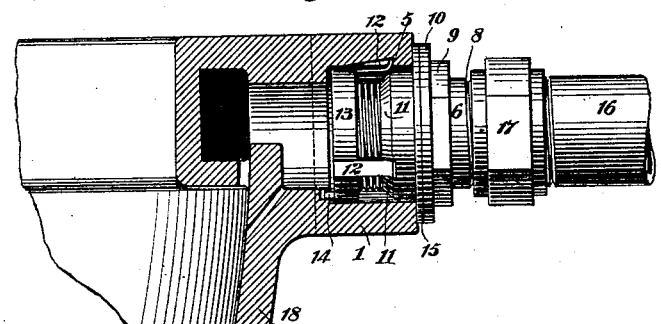

In the accompanying drawings, Figure 1 is a front elevation of the metal coupling or connection detached. Fig. 2 is a central vertical section of the same, taken at the line $x\ x$ of Fig. 1, and of an earthenware device to which said coupling is to be securely joined, the parts being simply fitted together and in position merely to make the connection. Fig. 3 is a vertical cross-section of the earthenware portion, taken at the line $y\ y$ of Fig. 4. Fig. 4 is a longitudinal central section of the earthenware portion; and Fig. 5 is an elevation of the coupling applied to the horn or inlet-nozzle of an earthenware water-closet bowl, which is shown in section, said coupling having attached at its outer end by an ordinary union-coupling the flushing or supply pipe.

In the several views the same part will be found designated by the same numeral of reference.

1 designates a tubular or hollow device, which is made of earthenware, porcelain, or like frangible or non-threadable material or substance, and which may be of any size or shape, and which may be itself either a pipe-section or a horn or inlet-nozzle of a water-closet bowl or basin. This device is formed with a centrally-arranged circular flange 2 at one end, which at one or more points is provided with a notch or depression 3. The said device 1 is formed interiorly at two or more points, preferably three, as shown, with recesses 4, preferably inclined or beveled to form shoulders or abutments 5.

6 designates a metal pipe-section or coupling having a thread 7 at one end and a thread 8 at the other, and intermediately a nut or angular portion 9 and circular flange 10, the whole being made integral. Between the threaded end 7 and the flange 10 the coupling 6 is provided exteriorly with a beveled or tapering annular surface 11, adapted to act upon and spread or force outwardly two or more, preferably three, fingers 12, preferably made of spring metal, which are dovetailed into a threaded nut 13 and secured by solder or otherwise.

The threaded end 7 of the coupling 6 screws into the nut 13, which is prevented from turning during this operation by a lug or projection 14, secured to or formed integral with said nut and seated or fitted into the notch or depression 3 in the earthenware portion.

In order to secure a perfectly-tight joint or connection between the coupling and the earthenware portion, a rubber, leather, or other suitable washer or gasket 15 is inserted between the outer face of the earthenware portion and the inner face of the circular flange 10.

In making the connection between the metal coupling and the earthenware device the nut 13 may be first fitted into the bore of the earthenware piece so that its lug or projection 14 enters the notch or slot 3, and so that the fingers 12 stand opposite or register with the inclined or beveled recesses 4 in the earthenware piece. The coupling 6 may then be screwed into the nut 13, which, as stated, is held against turning by the lug 14 in the notch 3, and as the coupling 6 advances the beveled or tapering surface 11 thereupon gradually forces outwardly or spreads the free ends of the spring-fingers and causes them to enter the recesses 4 in the earthenware piece. As the screwing in of the coupling 6 is continued by means of a wrench on the nut or angular portion 9 the points of the fingers are drawn up or forced against the shoulders or abutments 5, and hence the coupling and the earthenware portion are locked or held together endwise. When the points or ends of the spring-fingers have taken a bearing against the shoulders or abutments 5, the coupling may be advanced farther a slight distance to compress the packing or gasket 15 and produce an absolutely water-tight joint between the parts.

Of course, if desired, the nut or threaded ring 13 may be screwed upon the threaded nut 7 before its insertion into the bore of the earthenware part. The action of the coupling is the same in either case.

At Fig. 2 the parts are drawn to illustrate the condition of affairs just previous to the wedging of the spring-fingers into their recesses.

At Fig. 5 the connection is shown as completed, with the spring-fingers bearing against the shoulders or abutments. In this view I have also shown the supply-pipe 16 connected to the threaded end 8 of the coupling 6 by means of an ordinary union-coupling 17.

In practice, when the coupling has been screwed in far enough to throw the spring-fingers into the recesses, the coupling is drawn out slightly to cause said fingers to abut against the shoulders 5, the lug or projection 14 being sufficiently long to prevent it from being withdrawn from the notch 3 to guard against any rotation of the nut 13 during the final turning or screwing home of the coupling.

The earthenware part or section may be made integral with a water-closet bowl 18, as represented at Fig. 5, being joined thereto in the manufacture of such closets at the dotted line represented at said figure.

If it be desired at any time to disconnect the parts, the coupling, of course, may be simply unscrewed, and as soon as the annular wedging-surface has been sufficiently withdrawn the spring-fingers 12 will return to their initial positions out of the recesses, and thus enable the coupling with its nut 13 to be entirely detached.

By the means shown and described an exceedingly tight and uniformly even and true joint is made between the metallic and earthenware parts.

What I claim as new, and desire to secure by Letters Patent, is—

1. The combination, with a hollow or tubular device or member, as 1, having interior shoulders, of a threaded ring or nut within said hollow or tubular device or member and interlocked therewith against rotation, fingers projecting from said ring or nut and adapted to engage with said shoulders, and a tubular coupling having a threaded inner end, an expanding surface for said fingers, and a flange, as 10, located exteriorly of the tubular device or member 1, substantially as set forth.

2. The combination, with a hollow or tubular earthenware or analogous device having recesses and shoulders and a notched flange, of a threaded ring or nut having a lug or projection and spring-fingers, and a tubular metallic coupling having a threaded inner end, a wedging surface, a flange, and a packing-ring or gasket, substantially as set forth.

Signed at Trenton, in the county of Mercer and State of New Jersey, this 13th day of March, A. D. 1891.

EDWARD H. TAYLOR.

Witnesses:
W. H. SKIRM,
WM. S. BROUGHTON.